Figure 1:
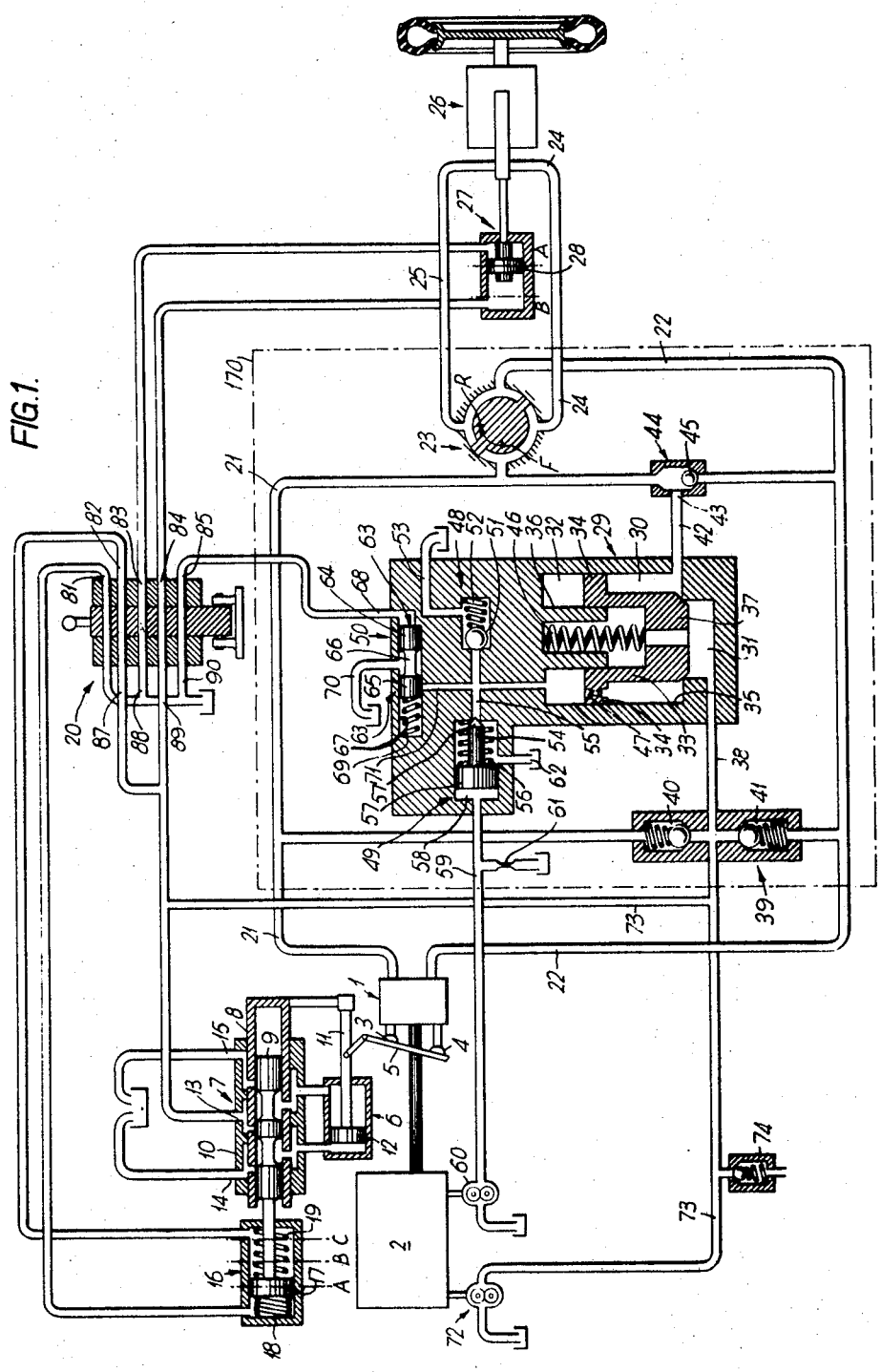

United States Patent

[11] 3,579,988

[72] Inventors: Donald Firth; Roger Harvey Yorke Hancock; James McCallum, East Kilbride, Glasgow, Scotland
[21] Appl. No.: 809,492
[22] Filed: Mar. 24, 1969
[45] Patented: May 25, 1971
[73] Assignee: National Research Development Corporation, London, England
[32] Priority: Mar. 25, 1968
[33] Great Britain
[31] 14374/68

[54] HYDROSTATIC TRANSMISSION CONTROL SYSTEM
12 Claims, 27 Drawing Figs.

[52] U.S. Cl. ............................................. 60/53, 180/44, 180/66
[51] Int. Cl. ......................................... F16d 31/06, B60k 7/00
[50] Field of Search ............................. 60/53, 53 (B), 53 (A); 180/66, 66 (F), 44

[56] References Cited
UNITED STATES PATENTS

| | | | |
|---|---|---|---|
| 1,318,143 | 10/1919 | Haffner | 60/53B |
| 1,407,047 | 2/1922 | Trowbridge | 60/53A |
| 2,161,439 | 6/1939 | Thoma | 60/53 |
| 2,260,859 | 10/1941 | Neuland | 60/53B |
| 3,485,315 | 12/1969 | Bergren | 180/66 |

Primary Examiner—Edgar W. Geoghegan
Attorney—Cushman, Darby and Cushman

ABSTRACT: A hydrostatic pump-and-motor transmission system, e.g. for a vehicle, in which the pump and the motor can have their displacement volumes varied in discrete steps to give a number of predetermined fixed ratios.

The pump is either a swashplate or variable eccentric pump adjustable to and between predetermined settings, or, a plurality of fixed displacement pumps switchable on the hydraulic side between, e.g. small pump alone, large pump alone, both pumps together.

The motor is either a multibank piston/cylinder motor with valving arrangements for cutting out one bank of cylinders from the fluid supply, or several separate motors —some disconnectable.

A hand selector sets up the various conditions e.g. three alternative pump displacement values with the motor at maximum displacement and two conditions with the motor at minimum displacement and the pump at two of the three pump displacement values.

Instead of using multibank motors and cutting out one bank, four motors on four wheels of a vehicle may give the maximum motor displacement condition, the motors of either front or the rear wheels being cut off from the pump, for the minimum motor displacement condition.

PATENTED MAY 25 1971

3,579,988

SHEET 3 OF 7

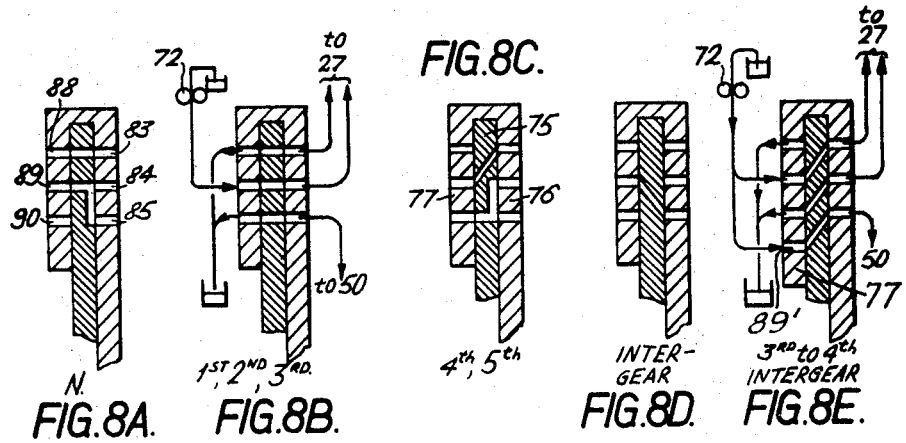
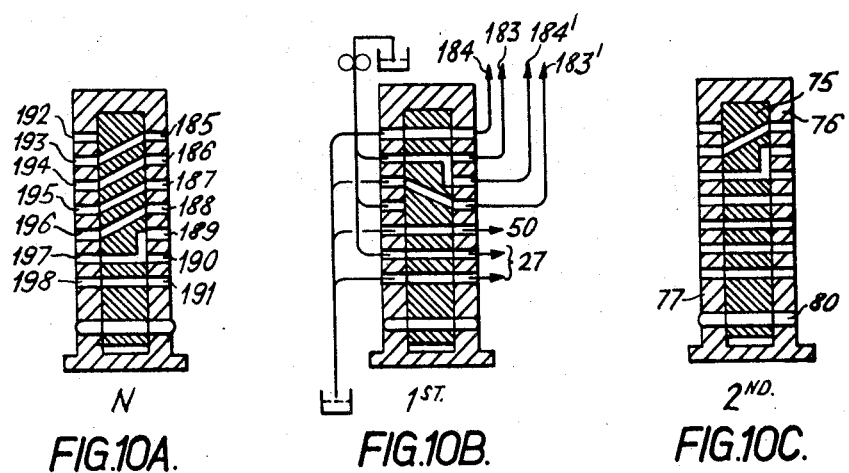
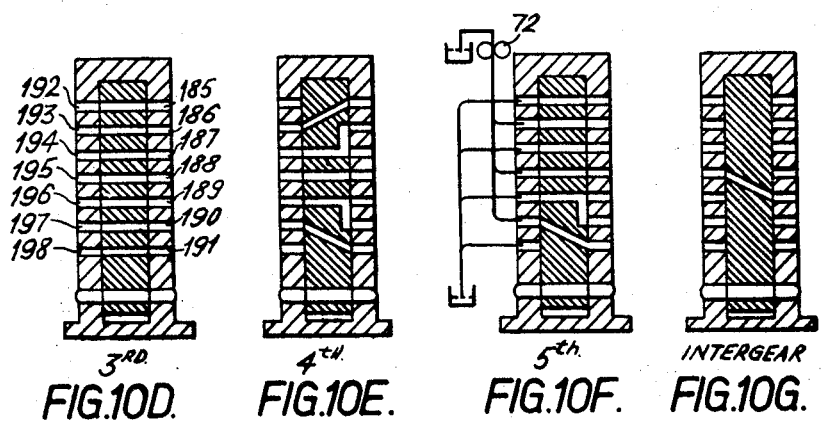

HYDROSTATIC TRANSMISSION CONTROL SYSTEM

This invention relates to variable-ratio hydrostatic transmission systems in which a positive displacement pump assembly adapted to be driven by a prime mover supplies fluid under pressure to a positive displacement motor assembly and in which the transmission ratio is varied by varying the displacement of the pump or the motor or both. The term "assembly" is to be regarded as a generic term embracing a single machine in which the displacement may be changed by varying the effective stroke of pistons or the equivalent, by varying the effective bore or the equivalent of the spaces in which pistons or the equivalent move or by throwing cylinders or other equivalent pumping chambers out of action to reduce displacement; alternatively the term embraces two or more machines, each complete in itself, one or some of which may be thrown out of action to reduce displacement.

In such a system the motor assembly is adapted to be coupled to the thing intended to be driven by the prime mover.

More particularly the invention relates to a hydrostatic transmission system of the type described and a control system therefore in which the displacement of the pump assembly or the motor assembly or both may be varied in discrete steps to provide a series of discrete ratios for the transmission system.

In hydrostatic transmissions as previously used the effective displacement of the pump or the motor, or both has been varied continuously to provide a continuously variable ratio for the system.

This is not universally desired by operators, of vehicles for instance, who are accustomed to conventional stepwise gear changes. There are however advantages to be reaped from a hydrostatic transmission system other than that of continuously variable ratio, for instance it renders it possible to drive all road wheels of a vehicle by motors mounted directly at the wheels, thus obviating the need for elaborate universally jointed transmission shafts and differential gearing. Situations arise in other contexts where analogous advantages exist and where continuous stepless change of transmission ratio is not desired.

According to the invention there is provided a hydrostatic transmission system in which a positive displacement pump assembly, adapted for connection to a prime mover supplies fluid under pressure to at least one positive displacement motor assembly adapted for connection to a load, control means for varying the displacement, in discrete steps, of at least one of them, the said pump assembly or the said motor assembly.

Preferably the displacement of both the said pump assembly and the said motor assembly is able to be changed.

Preferably means are provided for momentarily reducing the pressure of the fluid supplied by the pump assembly in the course of changing from one ratio to another of the transmission system.

Figure 2:
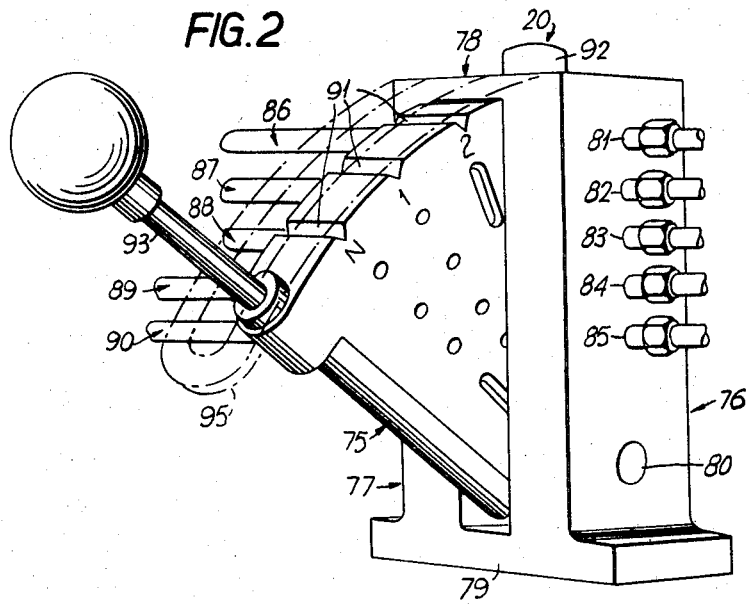
Figures 3A, 3B, 3C, 3D:
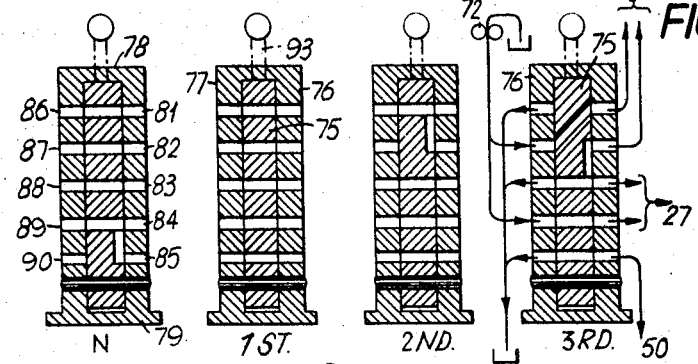
Figures 3E, 3F, 3G:
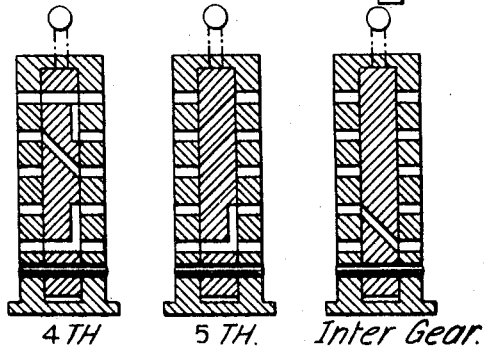
Figures 4, 11:
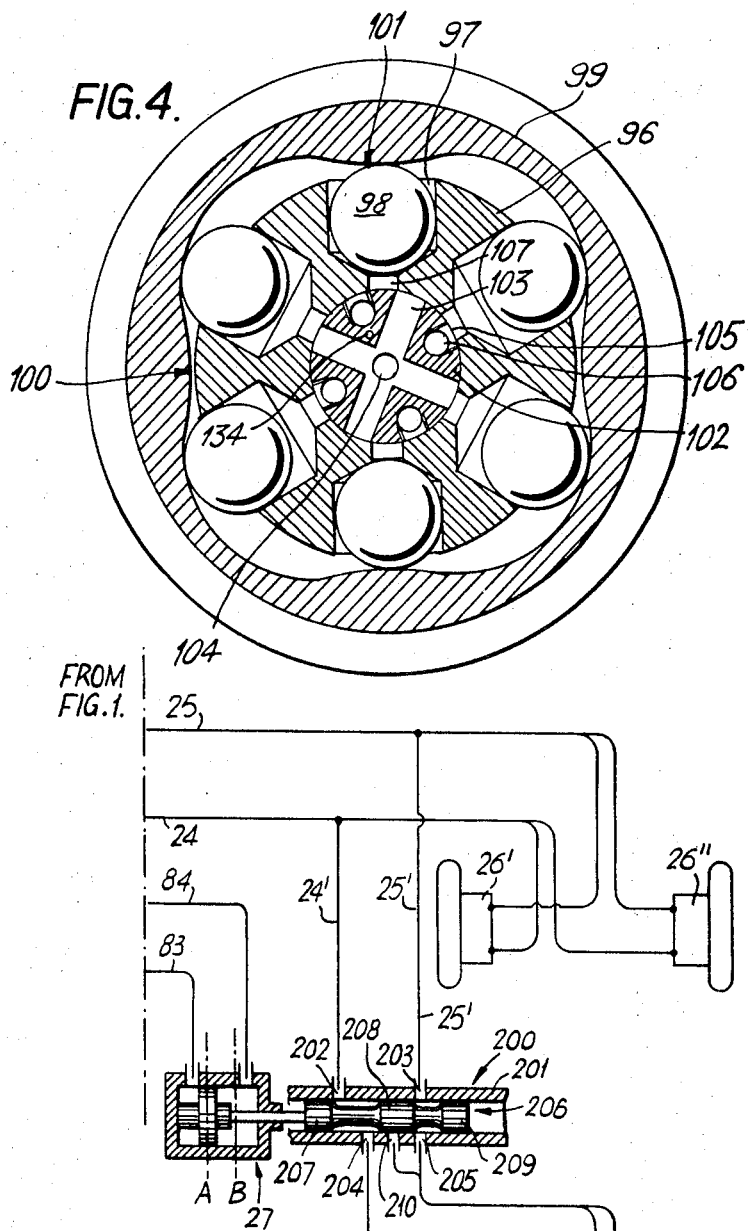
Figure 5:
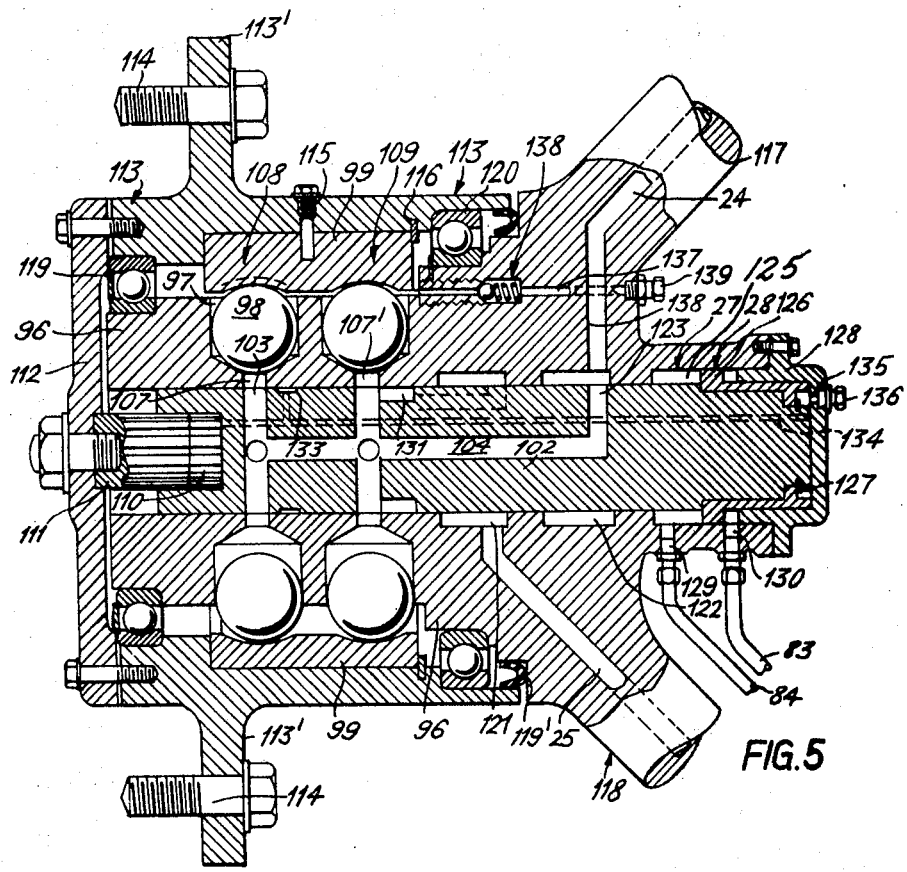
Figure 6:
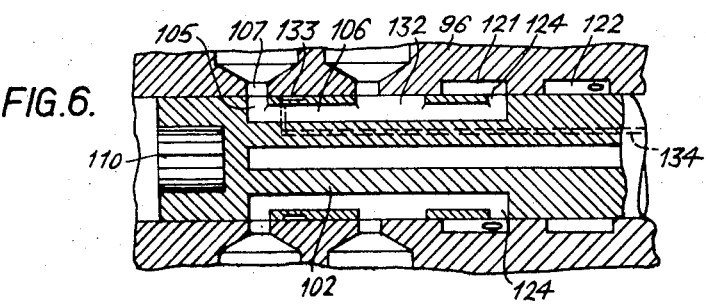
Figure 7:
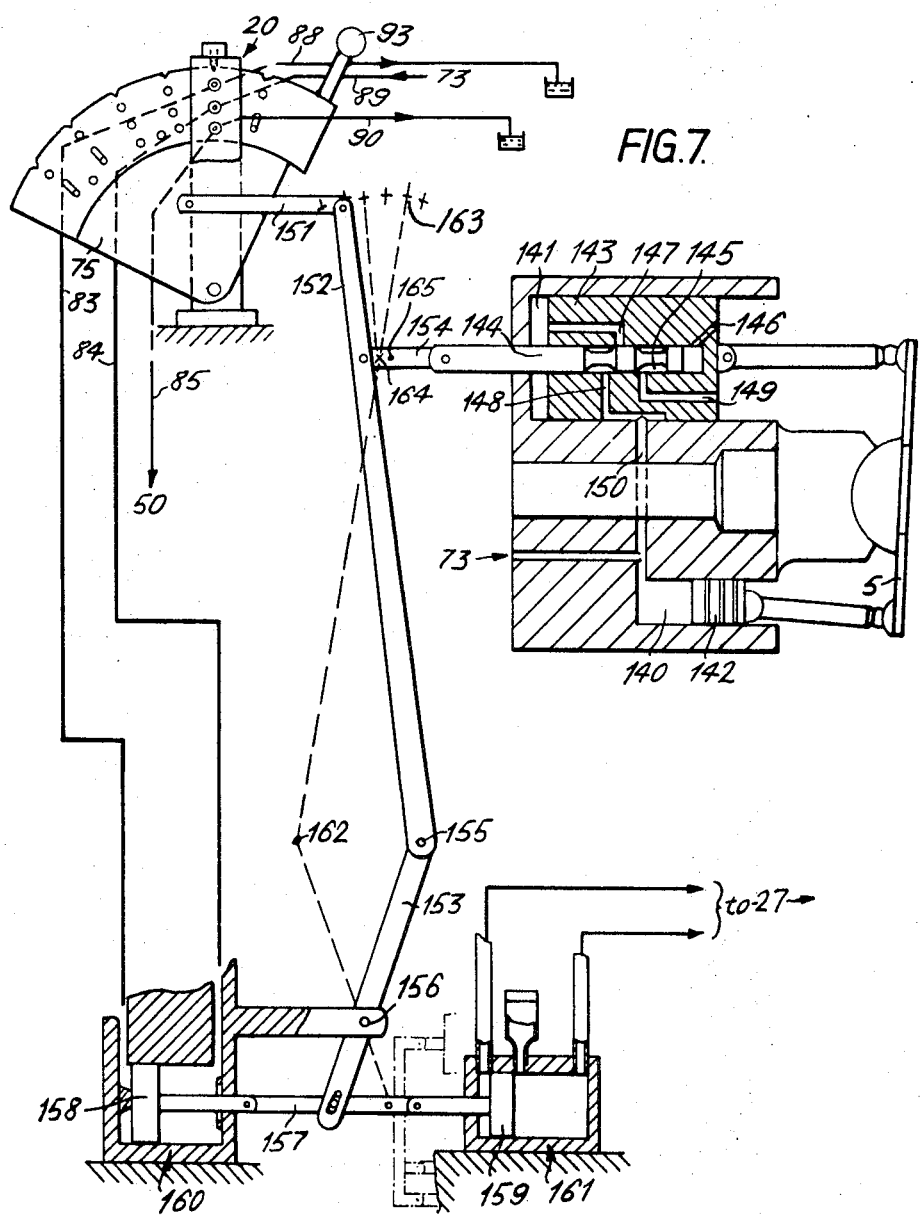
Figure 9:
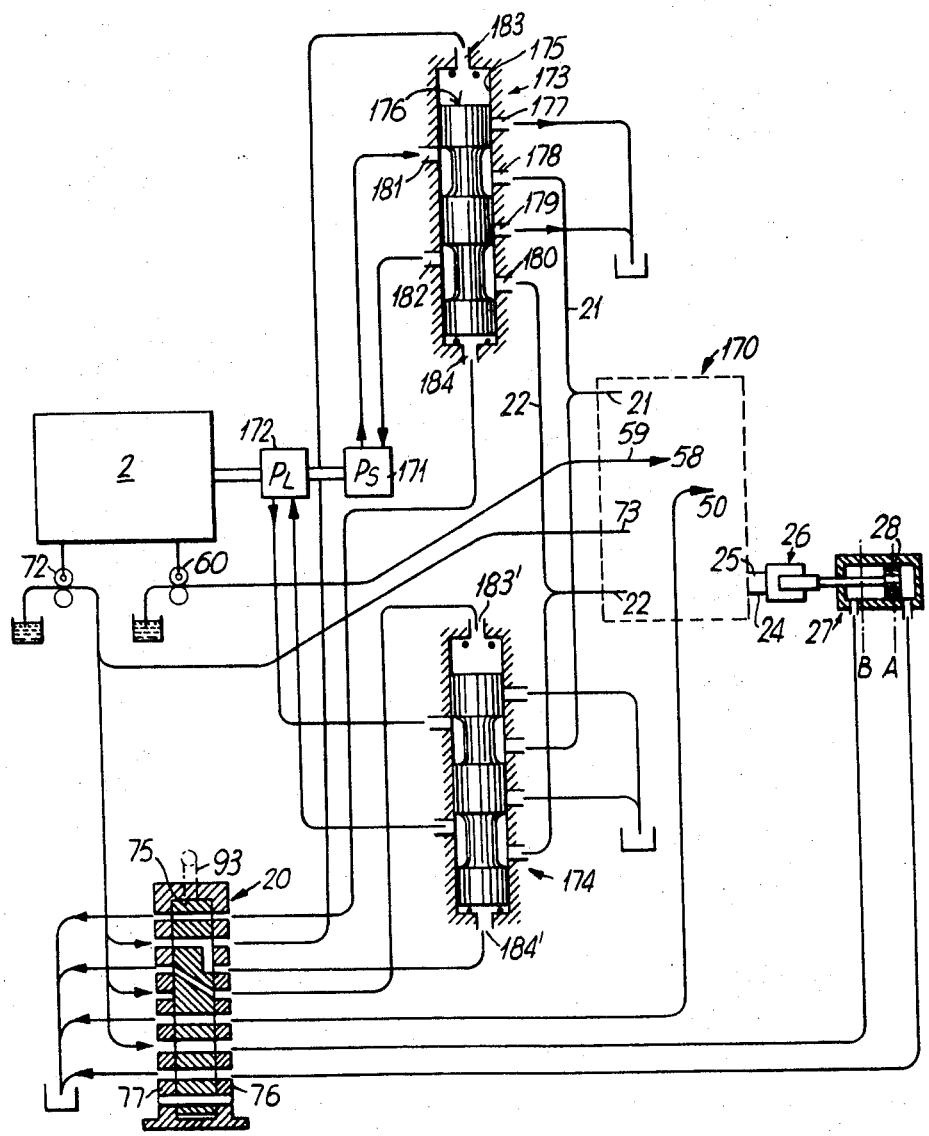

The invention will be more readily understood from the following description of certain embodiments thereof, illustrated in the accompanying drawings in which:

FIG. 1 is a general schematic drawing of a first embodiment of the invention,

FIG. 2 is a perspective drawing of a selector valve for the said first embodiment, FIGS. 3A to 3G are diagrammatic drawings of connections made by the said selector valve, FIG. 4 is a cross section of a motor for use in the invention, FIG. 5 is a longitudinal section of the said motor, FIG. 6 is a longitudinal section of part of the said motor, FIG. 7 is a general schematic drawing of a second embodiment of the invention, FIGS. 8A to 8E are diagrammatic drawings of connections made by a selector valve for use with the said second embodiment, FIG. 9 is a general schematic drawing of a third embodiment of the invention, FIGS. 10A to 10G are diagrammatic drawings of connections made by a selector valve for use with the said third embodiment, FIG. 11 is a schematic drawing of a modification of a part of the embodiment illustrated in FIG. 1.

In FIG. 1 a pump 1, driven by an engine 2, is of the so-called "swashplate" type, that is to say a barrel with axial cylinders arranged as in the chamber of a revolver is equipped with pistons in the cylinders and these pistons terminate in slippers (such as 3 and 4) which bear upon an inclined plate 5 (the swashplate). The plate 5 is stationary and the cylinder barrel rotates; a fixed port-plate valves the working fluid to and from the cylinders as they slide back and forth in the cylinders due to the inclination of the swashplate 5. The inclination of the swashplate 5 can be varied to vary the strokes of the pistons and hence the displacement of the pump.

The inclination of swashplate 5 is controlled by a double acting ram 6 which is in turn operated by a followup valve 7.

Followup valve 7 is a conventional three land, five port spool valve except that the sleeve 8 surrounding the spool 9 is itself movable in a valve body 10 which has elongated grooves communicating with the five ports of sleeve 8 to provide access to these ports notwithstanding the movement of sleeve 8. Sleeve 8 is coupled to the piston rod 11 of ram 6 so as to move with piston 12 and also with the swashplate. The action of the valve is that if the spool 9 is moved to the right the central upper inlet 13, carrying pressurized fluid from an auxiliary source to be described later, is put into communication with the left-hand side of piston 12 whilst one of the two outer upper inlets 14, 15, leading to the low pressure side of the said auxiliary source, is put into communication with the right-hand side of piston 12. Piston 12 then "follows" spool 9 to the right and the inclination of swashplate 5 is increased. When sleeve 8 has moved the same distance as spool 9 the lands of the spool again cut off access to and from both sides of piston 12 which is then hydraulically locked in the position then reached until spool 9 is again moved. In a corresponding manner moved to the left of spool 9 causes a corresponding movement to the left on the part of piston 12 to reduce the angle of inclination of swashplate 5.

Spool 9 is positioned by an actuator 16, which has a piston 17 coupled to spool 9. Piston 17 is biased to a central position by two springs 18 and 19, one bearing on each side of it. Pressurized fluid may be admitted to either side of piston 17 by means of a manually operated selector valve 20 so that piston 17 may be driven, against the resistance of one of the springs 18 or 19, to the end of its stroke. Piston 17 therefore has three positions, A, B and C, to which it can be controlled, which provides three positions of valve spool 9 three corresponding positions of piston 12, and three predetermined discrete angles of inclination of swashplate 5.

Selector valve 20 will be described below.

Two fluid conduits 21 and 22, connect pump 1 to the rest of the system. Where the pump is driving the motor conduit 21 is the high pressure conduit and conduit 22 the low pressure or return conduit. Conduits 21 and 22 pass to a reversing valve 23 which is controllable to interconnect conduits 21 and 22 to two other conduits 24–25, interchangeably, for driving the motor either backwards or forwards. The motor is indicated diagrammatically at 26. A preferred form of this motor is illustrated in FIGS. 4, 5 and 6; suffice it at this point to say that it is a ball piston radial cylinder machine having two banks of cylinders with ball pistons driven by two cams respectively and that by shuttling a pintle valve axially of the machine, between two positions, either both banks of cylinders are operating, or alternatively one bank is cut out leaving only one bank in action, so that the displacement of the motor is halved. FIG. 1 shows an actuator 27, having a piston 28 coupled to the pintle valve of the motor. In position A of piston 28 both banks of the motor are in operation; in position B only one bank of the motor is in operation.

Bridged across conduits 21 and 22 is a collection of valves the principle component of which is a bypass valve generally indicated at 29.

Bypass valve 29 has a central chamber 30, a lower chamber 31, and an annular upper chamber 32. A hat-shaped movable member has a tubular body 33, and a flange 34 the outer edge of which slides in sealing relation within a continuous bore 35, which forms the outer wall of both central chamber 30 and upper chamber 32 and flange 34 separates these two chambers. The inner wall of upper chamber 32 takes the form of a tubular projection 36 extending downwardly from the valve body and fitting within the tubular body 33 of the movable member. Upper chamber 32 is therefore annular in form. The lower end of tubular body 33 is closed by a crown member 37 which is shaped at its edge to seat upon corresponding edge of the lower chamber 31 the diameter of which is less than that of tubular body 33.

Lower chamber 31 communicates via a passage 38 with a low-pressure selector valve 39 which consists of two nonreturn valves 40 and 41. Valve 40 has a connection from conduit 21 and is poled to prevent flow from conduit 21 to passage 38. Valve 41 has a connection from conduit 22 and is poled to prevent flow from conduit 22 to passage 38.

The central chamber 30 communicates via a passage 42 with a central port 43 in a high-pressure selector valve 44, which has a central bore and a seating at each end for a movable obturator member 45 (which may be a ball). One of the said seatings communicates with conduit 21 and the other with conduit 22, and whichever of these conduits is at the higher pressure the obturator member 45 is driven towards the seating communicating with the other of the conduits 21, 22 so that the conduit which is at the higher pressure is in communication via passage 42 with central chamber 30.

The movable member of the bypass valve 29 is urged downwards by a spring 46 tending to force crown member down into seating relation with the upper edge of lower chamber 31. Flange 34 is pierced by a restrictor orifice 47, so that the pressure in the upper chamber 32 and the central chamber 30 tends to equalize. This further forces the movable member downwards because the area of the upper surface of flange 34 is greater than that of the lower surface by the cross-sectional area of tubular body 33. Thus, normally, the bypass valve 29 does not permit flow of fluid between conduits 21 and 22.

Bypass valve 29 can be opened to provide a low resistance short circuit between conduits 21 and 22 by releasing the pressure in the upper chamber 32. Three valves, a Pilot Pressure Limiting valve 48, a Clutch Pilot valve 49 and a Neutral Pilot valve 50, are provided for doing this.

Pilot Pressure Limiting valve 48 has a seating against which an obturator 51 is forced by a spring 52 to resist the pressure in upper chamber 32 tending to open the valve. When the pressure in conduit 21, passage 42, central chamber 30, and upper chamber 32, rises above a safe level, spring 52 is overcome and obturator 51 moves to exhaust upper chamber 32 to drain via passage 53. The flange 34 is then forced upwards by the excess pressure in central chamber 30 and crown 37 rises from the upper edge of lower chamber 31.

As the pressure in conduit 21 is greater than that in conduit 22, obturator 45 of valve 44 is sealed against the seating communicating with conduit 22 and conduit 21 is in communication, via passage 42, with central chamber 30. When crown 37 rises, the high pressure from conduit 21 passes via passage 38 to valve 39. The pressure is equalized on both sides of the upper element 40 of this valve, which remains closed, but the lower element 41 is now subjected to a higher pressure than that in conduit 22, to which it leads. The high pressure from conduit 21 is thus released to the lower pressure conduit 22.

Valves 39 and 44 are required to deal with the situation which arises when the pressures in conduits 21 and 22 are changed over, for instance when the load normally driven by motor 26 overruns the power transmitted from pump 1 either because the swashplate 5 is set at the zero-stroke position or the power from the engine is cut off. In this event, obturator 45 of valve 44 moves upwards to put conduit 22 into communication via passage 42, with central chamber 30 and when crown 37 rises, it is valve element 40, of valve 39 which opens.

The consequences of the operation of Clutch Pilot valve 49 and Neutral Pilot Valve 50 are the same as in the case of Pilot Pressure Limiting valve 48 so only the manner of operation of valves 49 and 50 need be described.

Valve 49 has a small diameter obturator 54, the conical end, 57′, of which is seated upon an aperture communicating with upper chamber 32 via a passage 55. Obturator 54 is forced away from the position in which it blocks passage 55, by a spring 56. Attached to obturator 54 is a piston 57 of considerably larger diameter than the effective sealing diameter of obturator 54, and this piston is housed in a cylinder 58 on its side remote from obturator 54. Cylinder 58 communicates, via a conduit 59 with an engine driven pump 60, which is a positive displacement pump producing a flow proportional to engine speed. An adjustable bleed valve 61 provides a leak from conduit 59 to drain so that a pressure proportional to a function of engine speed builds up on cylinder 58.

Spring 56 is chosen so that it prevails over the pressure in cylinder 58 when the engine is at idling speed so that upper chamber 32 is exhausted to drain via passage 55 and passage 62 leading to drain from the other side of obturator 54. When the engine speed is raised to the level at which it is required to start the load from rest, the pressure in cylinder 58 overcomes the force of spring 56 and the obturator 54 blocks passage 55. Pressure starts to build up in upper chamber 32, by leakage through orifice 47 and crown 37 descends to isolate central chamber 30 from lower chamber 31.

The pump 1 is now able to build up pressure in conduit 21 to drive motor 26.

The neutral valve 50 has a spool 63 having lands 64 and 65, separated by a stalk 66. The spool 63 is accommodated in a bore 67 and right-hand end of land 64 is subjected to the pressure in a duct 68 which is under control of the selector valve 20 as will be described later.

Opposing this pressure is a spring 69 bearing against the left-hand end of land 65. Between lands 64 and 65 is a duct 70 leading to drain and a duct 71, communicating with upper chamber 32, emerges into bore 67 in a position such that it is blocked by land 65 when spring 69 overcomes the pressure in duct 68 acting against land 64, as is normally the case when the transmission system is transmitting power. When the selector valve 20 is in the neutral condition, pressure from a precharge pump 72 is admitted to duct 68 forcing spool 63 to the left so that upper chamber 32 is vented to drain via duct 71 and duct 70.

Crown 37 then rises to short circuit conduits 21 and 22 so that pump 1 cannot drive motor 26.

Duct 68 is similarly pressurized by selector valve 20 when it is in positions intermediate its fixed ratio positions.

The remainder of the hydraulic circuit is as follows;

The precharge pump 72 is an engine-driven positive displacement pump delivering into a conduit 73, which is maintained at constant pressure by a blowoff valve 74.

This constant pressure serves two purposes: first it maintains the low pressure side of the system, (normally conduit 22) at a constant pressure above atmospheric pressure; secondly it provides a source of servo pressure for activating the pump followup servo valve 7 and the various functions controlled by selector valve 20. For the first of these two functions, conduit 73 communicates with the space in L.P. selector valve 39, between valves 40 and 41 and when pump 1 is driving motor 26, so that the full working pressure is present in conduit 21, the precharge pressure from pump 72 passes to conduit 22 through valve 41. Whenever the pressure in conduit 22 falls below the precharge pressure valve 41 opens to bring the pressure in conduit 22 up to the precharge pressure by flow via conduit 73.

Should the motor 26 overrun pump 1, the pressure in conduit 22 will rise above that in conduit 21 since motor 26, during its exhaust strokes will be discharging against a back pressure during the intake strokes of pump 1 which is constrained towards a lower throughput by the friction of engine 2 of which the fuel supply is restricted, this being the normal overrun condition. When this happens valve 41 is closed by the higher pressure in conduit 22 and conduit 21 is held to the precharge pressure from pump 72, via valve 40, as previously described in relation to valve 41. H.P. Selector valve 44 also changes its functions by ball 45 moving up to close off access from conduit 21 and the now higher pressure in conduit 22 passes via duct 42 to central chamber 30. Lower chamber 31 and duct 38 remain at the precharge pressure delivered by pump 72 however because they remain connected to conduit 73 via the center space of L.P. Selector valve 39.

Selector valve 20 and its operation will now be described in relation to FIG. 2 and FIGS. 3A, 3B, 3C, 3D, 3E, 3F and 3G.

A sector plate 75 is housed between two side pillars 76 and 77, bridged at the top at 78 and at the bottom at 79. A pivot pin 80 permits sector plate 75 to swing to different positions. Each of the side pillars 76 and 77 is pierced with five holes, 81, 82, 83, 84 and 85 for side pillar 76; 86, 87, 88, 89, 90 for side pillar 77.

Sector plate 75 has seven positions representing N (neutral) 1st ratio, 2nd ratio, 3rd ratio, 4th ratio and 5th ratio, these positions being marked by notches 91 in the arcuate upper surface of sector plate 75. A detent, housed in a turret 92 on the top of bridge piece 78, engages these notches to enable the six positions to be recognized by an operator when he actuates the sector plate 75 by means of a handle 93. Sector plate 75 has ports arranged in radial rows which make patterns of interconnections between the holes 81—85 of pillar 76 and holes 86—90 of pillar 77. The details of these ports are shown in FIGS. 3A to 3G. FIG. 3B shows the valve 20 in the setting in which it is shown in FIG. 1 The conduits and passages leading to valve 20 are evident from FIG. 1 so that there is no need to describe them in detail nor to give them specific reference numerals but where these conduits are referred to they will be given the same reference numerals as the holes 81—85, 86—90, to which they are connected. For convenience of drawing these reference numerals are marked against the holes in pillars 76 and 77 in FIG. 3A and the items to which the holes are connected are diagrammatically indicated in FIG. 3D, but these connections are shown in detail in FIG. 1.

The functions controlled by selector valve 20 are energized by the precharge pressure from pump 72, which is introduced at holes 87 and 89. The remaining holes 86, 88 and 90 of pillar 77, are connected to drain. The two holes 81 and 82 of pillar 76 are connected respectively to the left-hand and the right-hand sides of piston 17 of actuator 16; holes 83 and 84 are connected respectively to the right-hand and the left-hand sides of piston 28 of actuator 27, and hole 85 is connected via passage 68 to the right-hand end face of land 64 of spool 63 of Neutral Pilot valve 50.

The operation of the system will now be described with the assistance of FIG. 1 and FIGS. 3A—3G.

Selector valve 75 is moved from the N or neutral position shown in FIG. 3A, to the "1st gear" position shown in FIG. 3B in which five straight-through ports of plate 75 interconnect the respective holes of pillars 76 and 77 with their opposite holes, whereas in the N position, hole 90 was blocked and 89, carrying the precharge pressure was connected to hole 84, pressurizing the left-hand side of piston 28 of actuator 27, and hole 85 pressurizing the neutral pilot valve 50 to open the bypass valve 29. With selector valve 20 now in the "1st gear" position Neutral Pilot valve 50 is connected to drain by interconnection of holes 85 and 90 so that this path of escape from upper chamber 32 is blocked (through the escape path via Clutch Pilot valve 49 remains open); piston 17 of actuator 16 remains exhausted to drain on the left-hand side, (via holes 81 and 86) and remains pressurized on the right (via holes 82 and 87) so that piston 17 is forced to the left to the position A in FIG. 1 and piston 12 of actuator 6 is also held to the left by means of followup valve 7; swashplate 5 is therefore at a predetermined small angle setting; piston 28 of actuator 27 is held over in the right-hand or A position as previously explained in connection with the N position of valve 20.

The engine is now accelerated so that pressure builds up in cylinder 58 of Clutch Pilot valve 49 and the exhaust path from upper chamber 32, via passage 55 starts to close. Pressure builds up in upper chamber 32 and crown 37 descends to isolate conduit 21 from conduit 22, and remove the short circuit across them. Pump 1 in a low displacement setting, now drives motor 26 in a high displacement setting.

If selector valve 20 is moved to the "2nd gear" position, as shown in FIG. 3C, all remains as before except that hole 82 is disconnected from the precharge pressure at hole 87 and, with hole 81, is now connected to drain at hole 86.

Both sides of piston 17 of actuator 16 are now exhausted springs 18 and 19. Followup valve 7 follows this and moves piston 12 to midstroke and swashplate 5 is adjusted to a predetermined intermediate angle. Pump 1 at an intermediate displacement setting now drives motor 26 in a high displacement setting and the overall transmission ratio has been raised from that obtaining with selector valve 20 at the "1st gear" setting.

If selector valve 20 is now moved to the "3rd gear" setting shown in FIG. 3D all remains as before except that hole 81 is now bridged to the precharge pressure at hole 87 and hole 82 is bridged to drain via hole 88.

The connections to actuator 16 are now reversed as compared with those obtaining with valve 20 in the "1st gear" position shown in FIG. 3B and piston 17 is forced to the right-hand or C position, compressing spring 19. Followup valve 7 now moves piston 12 over to the right and swashplate 5 is adjusted to a predetermined maximum angle. Pump 1 at its maximum displacement setting now drives motor 26 at a high displacement setting and the transmission ratio is now at the highest value obtainable with the motor at a high displacement setting.

If now selector valve 20 is moved to the "4th gear" position shown in FIG. 3E, the connections to actuator 16 revert to those obtaining in the 2nd gear condition, i.e. both sides of piston 17 are evacuated to drain and it is centralized by springs 18 and 19 so that swashplate 5 reverts to the predetermined intermediate angle. Hole 83 is bridged to drain via hole 90 so that the connections to actuator 27 are reversed and piston 28 moves to the left and motor 26 is changed to a low displacement condition. If motor 26 alone had been changed and pump 1 left in the maximum displacement condition, the ratio gap between "3rd gear" and "4th gear" would be too great so that pump 1 is reduced to the intermediate displacement condition to reduce this ratio gap.

If selector valve 20 is now moved to the "5th gear" position shown in FIG. 3F the connections to actuator 16 revert to those obtaining in the "3rd gear" (FIG. 3D), setting and the pump is again in the maximum displacement condition. The connections to actuator 27 are unchanged except that, for practical reasons, the precharge pressure for the right-hand side of piston 28 is now obtained (at hole 83) from hole 89 instead of hole 87. Pump 1 at maximum displacement now drives motor 26 at minimum displacement.

To avoid surges on changing between the positions of sector plate 75 illustrated in FIGS. 3A to 3F, it may be arranged that, at intermediate positions all the holes 86—90 and 81—85 are disconnected from one another except for a connection from precharge pressure at hole 89 and hole 85 leading to the right-hand face of land 64 of spool 63 of Neutral Pilot valve 50.

This causes crown 37 of the bypass valve 29 to rise and dump the pump delivery pressure across from conduit 21 to the low pressure pump intake conduit 22. This is equivalent to the normal practice of declutching on gear changing in a conventional gear box transmission.

Reverse drive is obtained by rotating valve 23 through 90° so that conduit 21 delivers into conduit 25 leading to motor 26 and conduit 22 is connected to conduit 24 leading to motor 26, so that the latter revolves the opposite way round.

Valve 23 may be operated manually by a separate control lever with subsequent operation of valve 20 as described for forward driving, that is to say with all five "gears" available also in reverse. Alternatively reversing valve 23 may be mechanically linked to sector plate 75 of selector valve 20 so that it is changed to the "reverse" condition when sector plate 75 is moved from the N or neutral condition of FIG. 3A but in the opposite direction from that leading to the five "gears" previously described. When in this position ports would have to be provided in sector plate 75 to cross-connect the holes 81—85 and 86—90 in the manner shown in FIG. 3B. It might be desirable to allow sector plate 75 to move to a second position after operating reversing valve 23 this second position providing a pattern of ports such as those shown in FIG. 3C in order to provide two transmission ratios in reverse. These might be marked "R₁" and "R₂" on the display. In practice, overlying the upper edge of sector plate 75 and attached to or integral with upper bridge piece 78. Such a mask plate is lightly sketched in at 95 on FIG. 2. It would be engraved with marks such as "$R_2$," "$R_1$," "N," "$F_1$," "$F_2$," "$F_3$," "$F_4$," "$F_5$" for the arrangement above suggested, where reversing valve 23 is linked to sector plate 75 and where two ratios are available in reverse.

Reversing valve 23 is shown diagrammatically in FIG. 1.

FIGS. 4, 5 and 6 illustrate a preferred form for motor 26, incorporating actuator 27. This motor is of the radial-cylinder ball piston type. A cylinder block 96 has six radial bores such as 97 each of which has a closely fitting ball piston such as 98, movable axially of the cylinder between the fully inward position shown in FIG. 6 for ball 98, and a position at which the equatorial plane of the ball normal to the cylinder axis is just inside the mouth of the cylinder, giving a stroke a little less than the radius of the ball. A cam ring 99 has four complete lobes such as that extending from point 100 to point 101.

When relative rotation takes place between the cylinder block 96 and cam ring 99 the ball pistons move radially in and out in their cylinder bores due to their contact with the lobes of cam ring 99 upon which they roll. A central cylindrical pintle valve 102 is anchored rotationally to cam ring 99 and it contains four ports such as 103 which are equally spaced around the circumference of pintle valve 102 and communicate with a central supply channel 104, and four similar other ports, such as 105, interspersed between the ports such as 103, each of which communicates with a separate supply channel such as 106, these channels being interconnected as hereafter explained in connection with FIG. 6.

The ports such as 103 are connected as hereafter explained in connection with FIG. 5, to conduit 24 and, with the reversing valve 23 in the position shown in FIG. 1, these ports are in communication with conduit 21 carrying the high delivery pressure from pump 1. Similarly the ports such as 105 are connected, via conduit 22 to the low-pressure or intake side of pump 1. As cam ring 99 and pintle valve 102 rotate in relation to cylinder block 96, holes such as 107, leading to cylinder bore 97, come successively into communication with ports such as 103 and 105 whereby each cylinder is successively brought into communication with high pressure from conduit 21 and low pressure from conduit 22 at timings appropriate to the positions of the balls in relation to the lobes of cam ring 99. If cam ring 99 and pintle valve 102 are rotating anticlockwise ball 98 is at the inner end of its stroke and about to begin a power stroke; it is just about to come into communication with a port such as 103 carrying high pressure. The balls are thus forced outwardly against the lobes of cam ring 99 during power strokes and are forced inwardly by the lobes during the exhaust stroke as in the case of the ball to the right of ball 98 which is in the middle of an exhaust stroke and in communication via a port such as 105 with the low pressure side of the pump. This low pressure is above atmospheric pressure by reason of conduit 22 being in connection with the precharge pressure from pump 72. This is sufficient to keep a ball from leaving the cam lobe, due to inertia, towards the end of an exhaust stroke.

FIG. 5 shows the motor in axial section. There are two banks of cylinders such as that shown in FIG. 4, and these are generally designated 108 and 109. The passage 104 communicates with two banks of ports such as 103 and passages such as 106 communicate with two banks of ports such as 105, the latter being shown in FIG. 6.

Arrangements are made for shifting pintle valve bodily (to the left in FIG. 5) to cut out cylinder bank 108. For this purpose the left-hand end of pintle valve 102 has a splined recess 110 in which fits a splined peg 111 anchored to an end coverplate 112 which is fixed to a rotating outer casing 113 of the motor. Casing 113 is formed as a hub for a wheel and is equipped with a flange 113' carrying wheel studs such as 114. Pintle 102 is constrained by this means to rotate with casing 113 and cam ring 99 is secured within this casing by dowels such as 115 and a spring ring 116.

Cylinder block 96 is the fixed part of the motor assembly and has limbs 117 and 118 adapted for connection to suspension members of a vehicle, (e.g. the so-called "wishbones" of an independent suspension system).

Ball bearings 119 and 120, one located on each side of the cylinder banks 108 and 109, support casing 113 for rotation upon cylinder block 96.

Pintle 102 extends through the whole length, from left to right, of cylinder block 96 which is bored out to receive it with a running fit. To the right of cylinder banks 108 and 109 this bore is recessed by two circumferential grooves 121 and 122. Groove 121, (on the left), is joined by a duct running through limb 118, which duct represents conduit 25 of FIG. 1. Groove 122 (on the right) is joined by a duct running through limb 117, which duct represents conduit 24 of FIG. 1.

Passage 104 in pintle valve 102 extends to the right as far as the right-hand side of groove 122 and a radial hole 123 puts groove 122 into communication with passage 104. The passages such as 106 of pintle valve 102 extend to the right as far as the right-hand side of groove 121 and radial holes such as 124 put groove 121 into communication with the passages such as 106.

The bore containing pintle valve 102 is enlarged, at its extreme right-hand end, to form a cylinder 125 in which fits a piston element 126 secured to the right-hand end of pintle valve 102 by a spring ring 127. A closure cap 128 is secured to the end of cylinder block 96 and provides the right-hand cylinder end of cylinder 125.

Radial holes 129 and 130 bored through the walls of cylinder 125 communicate with the interior of this cylinder on either side of piston element 126 and are connected by pipe unions to conduits 83 and 84 leading from correspondingly numbered holes of selector valve 20 (see FIG. 1).

When conduit 83 is pressurized, (on reaching "4th gear"), pintle valve 102 is driven bodily to the left so that its inlet ports such as 103 lose communication with the cylinders of bank 108 but as the corresponding ports for cylinder block 109 are slotted as at 131, communication with the cylinders of block 109, is not lost. FIG. 6 shows that the exhaust ports such as 105 are similarly slotted, as at 132 for the same reason.

When the ports such as 103 and 105 are moved out of register with the holes leading to the cylinders of bank 108, these cylinders would be hydraulically locked but for the provision of a groove 133 around the outer surface of pintle valve 102 and to the left of the ports 103, 105 for bank 108. This groove communicates with a duct 134 bored along pintle valve 102, to the right and ending in the dead space between the valve and end cap 128, which is drained to atmospheric pressure via a drain hole 135. Duct 134 is also continued to the right to communicate with the space to the left of pintle 102 to prevent a buildup of pressure therein. A union 136 connects hole 135 to a drainpipe (not shown) which may be connected directly to the drain in the vicinity of pump 1. To retain the balls of bank 108 at the inner ends of their strokes and out of contact with the cam ring 99, the outside cylinder block 96 is flooded with hydraulic fluid at pressure of about 15 p.s.i. This is achieved by sealing the space surrounding the cylinder block in the vicinity of bearings 119 and 120 so that fluid leaking past the ball pistons accumulates in that space. This fluid is vented via a spring loaded relief valve 138, set in a duct 137 leading to a pipe union 139 to which is connected a pipe (not shown) which vents the passage 137 to drain in the same way as does the pipe connected to union 136. Valve 138 is adjusted to open when the pressure in the space surrounding cylinder block 102 reaches 15 p.s.i.

A second embodiment of the invention will now be described in relation to FIG. 7 and FIGS. 8A, 8B, 8C and 8D.

Instead of controlling the pump followup valve 7 hydraulically by actuator 16, as in FIG. 1, the spool of the valve is directly linked to the sector plate 75 of selector valve 20, the latter being somewhat simplified.

A somewhat more sophisticated actuator is provided for swashplate 5 consisting of two parallel spaced-apart cylinders 140 and 141, the former of which is smaller than the latter and is permanently subjected to the precharge pressure via conduit 73 from pump 72 and its piston 142 acts on swashplate 5 on one side of its trunnion axis in a direction tending to reduce the displacement of pump 1. The larger piston 143 of cylinder 141 acts on swashplate 5 on the other side of its trunnion axis in a direction tending to increase the displacement of pump 1 and this piston forms part of the followup valve by which it is positioned. A spool 144 passes through the end of cylinder 141 and enters a bore 145 passing through piston 143 to a blind end which is vented at 146 to the free end of that piston.

A port 147 enters bore 145 at an intermediate point and this port is covered by the center land of spool 144 when the piston 143 is in equilibrium, and in this position two spaced-apart ports 148 and 149 are opposite the respective spaces between this center land and two outer lands. Port 148 communicates with an axially elongated slot in the outer cylindrical surface of piston 143 and is of such a length and so positioned that it communicates with the passage 150 through which the precharge pressure from conduit 73 is applied to cylinder 140, for all positions of piston 143. Port 149 communicates with the free outer end of piston 143.

Sector plate 75 of selector valve 20 acts on spool 144 via a first link 151 and a lever 152, which pivots about the upper end of another lever 153. An intermediate point of lever 152 is coupled to spool 144 by a second link 154. As sector plate 75 is turned clockwise to engage ratios in the order N–1st, 2nd, 3rd—etc., spool 144 is moved to the right so that its central land uncovers port 147 to put it into communication with port 148, whereupon pressure from conduit 73 passes into cylinder 141 and piston 143 is forced to the right until port 147 is again covered by the central land of spool 144. Piston 143 prevails over piston 142 by reason of its larger area. There is thus at all times a pressure to the right against swashplate 5 which is balanced about its trunnion bearing and which reduces the load on the latter due to the forces from the pistons of the pump.

When spool 144 moves to the left port 147 is put into communication with port 149 exhausting cylinder 141 so that piston 142 prevails over piston 143 and reduces the angle of swashplate 5.

As handle 93 is moved to the right, lever 152 pivots clockwise about pivot point 155 and spool 144 is also moved to the right and the angle of swashplate 5 is increased by predetermined amounts to produce desired ratios for the transmission system.

Pivot point 155 is located by the top end of lever 153 which is anchored at a fixed pivot point 156. The lower end of lever 153 is coupled to a link 157 which joins together two pistons 158 and 159 accommodated respectively in cylinders 160 and 161. Piston/cylinder 158/160 is connected to the points 83, 84 on selector valve 20 corresponding to the points connected to actuator 27 in FIG. 1 and the operation of piston/cylinder 158/160 acts in the same way as actuator 27 of FIG. 1, to change the displacement of motor 26 except that it operates remotely through piston/cylinder 159/161 which resembles the master cylinder of a conventional hydraulic brake system. In the "4th gear" position of sector plate 75 the connection of precharge pressure at hole 89 and the connections to drain at hole 88 to holes 84 and 83 respectively, which obtained in 1st, 2nd, and 3rd gears, are exchanged for connections from precharge pressure at hole 89 to hole 83 and from drain at hole 90 to hole 84. Pistons 158 and 159 are then driven over to the right and actuator 27 is operated to reduce the displacement of motor 26. Also lever 153 swings over anticlockwise so as to shift the fulcrum point at the lower end of lever 152, from 155 to 162. The upper end of lever 152 is held fixed, by sector plate 75 in a position 163 corresponding to "4the gear" and the lever swings clockwise about this point and spool 144 is carried to the left to a position 164 in the region of that which it reached in "2nd gear," through position 164 is chosen, by adjusting the geometry of levers 152 and 153, so that, in combination with the decrease in the displacement of motor 26, an appropriate ratio interval between "3rd gear" and "4th gear" is provided. Without this adjustment of the displacement of pump 1, this ratio gap would be disproportionately great.

The change to "5th gear" merely shifts spool 144 further to the right, from point 164 to a point 165, bringing the displacement of pump 1 back to the maximum value previously reached in "3rd gear."

The connections made by sector plate 75 are shown in detail in FIGS. 8A, 8B, 8C and 8D, which are self-explanatory. Again as in the FIG. 1 embodiment, an "intergear" position operates Neutral Pilot valve 50 to short circuit pump 1 between ratio changes.

In the above description of the change from "3rd gear" to "4th gear" the fact was ignored that before the connections shown in FIG. 8C are established valve 144 will have been moved beyond the position which it had reached in "3rd gear." There will generally be some available movement of swashplate 5 remaining for this to take place because it is not necessarily desirable for the stroke of the pump to be at its absolute maximum in "3rd gear" since it may be required to use a somewhat higher pump stroke in "5th gear." On first moving handle 93 to shift from "3rd gear" to "4th gear," in these circumstances the stroke of pump 1 will initially be increased slightly which will cause a slight rise in the transmission ratio. This will only be momentary however because the selector valve will pass into the "intergear" condition of FIG. 8D which opens valve 29 to dump the pump 1 output. Should valve 29 close in the interval between the "intergear" condition of FIG. 8D and the "4th gear" position of FIG. 8C the drive will be resumed in a somewhat higher ratio than "3rd gear" ratio but on attainment of the "4th gear" connections of FIG. 8C, there will be a rise in ratio by virtue of reduction in the displacement of the motor 26, which is diminished but not cancelled by the shift of valve 144 to the left due to the shift of the bottom of lever 152 from point 155 to point 162.

In an alternative arrangement the geometry of levers 152 and 153 is arranged so that valve 144 is withdrawn to the left on movement of piston 158 to the right, by an amount sufficient to cancel the effect on the overall ratio, of the reduction of the displacement of motor 26. A modified "intergear" condition is desirable for the gap between "3rd gear" and "4th gear" and this is shown in FIG. 8E. The holes are proportioned so that the connections of FIG. 8E commence to occur with negligible movement of handle 93.

In FIG. 8E it will be seen that pillar 77 has been equipped with a fourth hole 89, connected to the output from pump 72, so that the connections of FIG. 8C, less the connection between holes 90 and 85, can be combined with the connection of FIG. 8D which causes valve 29 to open to dump the output of pump 1. There is thus an intermediate operation between "3rd gear" and "4th gear" in which the motor displacement is reduced with a cancelling reduction of the pump stroke, causing no change of overall ratio, before the pump stroke is again increased, on plate 75 reaching "4th gear" position, to provide a ratio gap between "3rd gear" and "4th gear."

It is an advantage of the embodiment of FIG. 7 that a plurality of motors can have their displacements simultaneously altered by individual actuators such as 161, which are positive in operation, all such actuators being mechanically coupled in parallel to connecting rod 157.

As a precaution against fall of pressure from the remote control system, cylinder 161 and actuator 27, it is preferable to provide detents and notches on the splined peg and the splined hole in pintle valve 102 so that the latter is retained in either of its two positions, a substantial force from actuator 27 being required to shift it out of one position and into another.

A third embodiment of the invention is illustrated in FIG. 9 and FIGS. 10A, 10B, 10C, 10E, 10F and 10G.

In FIG. 9 the items within a dotted line rectangle 170 are the same as those within a corresponding dotted line rectangle (also denoted 170), in FIG. 1 and corresponding items in the two FIGS. have corresponding reference numerals.

Instead of the single variable displacement pump 1 of FIG. 1, two fixed displacement pumps are used. One of these, 171 is of relatively small displacement. The other, 172, is of relatively large displacement, (it may have twice the displacement of pump 171).

Both these pumps are coupled to engine 2 but they are used in the order—small pump 171—large pump 172—both pumps together—to vary the ratio of the transmission system, in the same way that, in FIG. 1, pump 1 was changed in displacement in three steps corresponding to the positions A, B and C, of actuator 16.

To achieve this the intake and delivery ducts of each pump are connected to a valve, 173 for pump 171, 174 for pump 172. As both these valves are identical only valve 173 need be described; it has a bore 175 containing a spool 176 having three lands. Four equally spaced output ports 177, 178, 179 and 180 are connected, 177 and 179 to drain, 178 and 180 respectively to conduits 21 and 22. Two input ports 181 and 182 are spaced between ports 177 and 178 and 179 and 180 respectively.

End ports 183 and 184 are connected to appropriate holes in selector valve 20, so that one end may be connected to the precharge pressure from pump 72 and the other to drain or vice versa. This causes the spool 176 to move to one end or the other, in bore 175. In one position the two input ports 181 and 182 are connected respectively to conduits 21 and 22; in the other position the input ports 181 and 182 are both connected to drain so that the corresponding pump is out of action.

In FIG. 9 selector valve 20 is shown in the "1st gear" setting. This valve has seven holes in each of the side pillars 76 and 77. From the top downwards these holes and their connections are as follows:

In pillar 76; 185—to bottom end port 184 of small pump valve 173; 186—to top end port 183 of valve 173; 187—to bottom end port 184' of large pump valve 174; 188—to top end port 183' of valve 174; 189—to neutral pilot valve 50; 190—to left side of piston 28 of motor actuator 27; 191—to right-hand side of piston 28: in pillar 77; 192—to drain; 193—to precharge pressure (from pump 72); 194—to drain; 195—to precharge pressure; 196—to drain; 197—to precharge pressure; 198—to drain.

The connections made in the various settings of selector valve 20 are shown in detail in FIGS. 10A—10G. In FIG. 10A the reference numerals of the holes of pillars 76 and 77 are shown. In FIG. 10B the connections to these holes are shown diagrammatically. In FIG. 10C the structural parts of the valve are denoted with the same reference numerals as are used for FIG. 2.

These connections are tabulated below:

It is to be understood that motor 26 of FIGS. 1, 7 and 9, may represent one of two or more motors driving individual wheels, in a vehicle installation.

Such motors would be connected in parallel to conduits 24 and 25 and their displacement-changing actuators 27 would similarly be connected in parallel to holes 83 and 84 of selector valve 20 (FIG. 1) or corresponding holes (FIG. 9). In the embodiment of FIG. 7, as already explained each motor would have an independent remote control actuator such as 161 and these actuators would be mechanically linked in parallel to a single actuator 160.

This arrangement would provide automatic differential action to the wheel motors since a motor subjected to a higher load (e.g. inside wheel when cornering) would slow down and a wheel subjected to a lower load (e.g. outside wheel when cornering) would speed up, thus distributing the flow from the pump between wheels according to their loading.

As an alternative to a sector value of the type shown in FIG. 2, the actual valving operations may be controlled by a number of simple spool valves or the like, each operable between two states by a manually operated drum or the like with patterns of indentations such as to actuate the valves to the required patterns of conditions corresponding to the conditions set up in the various positions of a selector valve such as the one illustrated in FIG. 2.

In a vehicle installation using a transmission system of the general type illustrated in FIG. 1, the somewhat complicated two-capacity motor (such as is illustrated in FIGS. 4, 5 and 6) may be dispensed with, in the manner shown in FIG. 11.

In FIG. 11 the four wheels of a vehicle have their individual motors, 26', 26'' for, say the front wheels and 26''', 26'''' for say, the rear wheels, these motors being of any conventional fixed-capacity type suitable for the speeds and torques required.

For the lower ratios, (1st, 2nd and 3rd, according to FIGS. 3A—3G), all four wheel motors are in operation but for the higher gears (4th and 5th according to FIG. 3A—3G), the motors 26''' and 26'''' are cut off from the supply from pump 1, instead of cutting off the one cylinder bank 108 of a two-cylinder-bank motor as illustrated in FIG. 5 and leaving half a motor in action on each of the four wheels. Some of the advantages of using individual wheel motors is lost when this ex-

| "Gear" | Fig. No.— | 77 hole to | 76 hole | Connecting to— | | Effect |
|---|---|---|---|---|---|---|
| Neutral | 10A | 193 | 185 | Pressure | 184 | Pump 171 disabled. |
| | | 194 | 186 | Drain | 183 | |
| | | 195 | 197 | Pressure | 184' | Pump 172 disabled. |
| | | 196 | 188 | Drain | 183' | |
| | | 197 | 189 | Pressure | 50 | Pump outputs dumped at 29. |
| | | 197 | 190 | Pressure | Left of 28 | Motor 26 at high displacement. |
| | | 198 | 191 | Drain | Right of 28 | |
| 1st gear | 10B | 192 | 185 | Drain | 184 | Pump 171 working. |
| | | 193 | 186 | Pressure | 183 | |
| | | 193 | 187 | Pressure | 184' | Pump 172 disabled. |
| | | 194 | 188 | Drain | 183' | |
| | | 196 | 189 | Drain | 50 | Valve 29 closed. |
| | | 197 | 190 | Pressure | Left of 28 | Motor 26 at high displacement. |
| | | 198 | 191 | Drain | Right of 28 | |
| 2nd gear | 10C | 193 | 185 | Pressure | 184 | Pump 171 disabled. |
| | | 194 | 186 | Drain | 183 | |
| | | 194 | 187 | Drain | 184' | Pump 172 working. |
| | | 195 | 188 | Pressure | 183' | |
| | | 196 | 189 | Drain | 50 | Valve 29 closed. |
| | | 197 | 190 | Pressure | Left of 28 | Motor 26 at high displacement. |
| | | 198 | 191 | Drain | Right of 28 | |
| 3rd gear | 10D | 192 | 185 | Drain | 184 | Pump 171 working. |
| | | 193 | 186 | Pressure | 183 | |
| | | 194 | 187 | Drain | 184' | Pump 172 working. |
| | | 195 | 188 | Pressure | 183' | |
| | | 196 | 189 | Drain | 50 | Valve 29 closed. |
| | | 197 | 190 | Pressure | Left of 28 | Motor 26 at high displacement. |
| | | 198 | 191 | Drain | Right of 28 | |
| 4th gear | 10E | 193 | 185 | Pressure | 184 | Pump 171 disabled. |
| | | 194 | 186 | Drain | 183 | |
| | | 194 | 187 | Drain | 184' | Pump 172 working. |
| | | 195 | 188 | Pressure | 183' | |
| | | 196 | 189 | Drain | 50 | Valve 29 closed. |
| | | 196 | 190 | Drain | Left of 28 | Motor 26 at low displacement. |
| | | 197 | 191 | Pressure | Right of 28 | |
| 5th gear | 10F | 192 | 185 | Drain | 184 | Pump 171 working. |
| | | 193 | 186 | Pressure | 183 | |
| | | 194 | 187 | Drain | 184' | Pump 172 working. |
| | | 195 | 188 | Pressure | 183' | |
| | | 196 | 189 | Drain | 50 | Valve 29 closed. |
| | | 196 | 190 | Drain | Left of 28 | Motor 26 at low displacement. |
| | | 197 | 191 | Pressure | Right of 28 | |
| Inter-gear | 10G | Only 195-Po-189; all other holes | | Pressure | 50 | Valve 29 open and pump outputs dumped. | pedient is adopted in that four-wheel-drive is sacrificed for the higher ratios, but in many applications this sacrifice is compensated by a substantial reduction in cost, complexity and unsprung weight.

In FIG. 11, the actuator 27, instead of acting on the pintle of a motor such as 26 in FIG. 1, operates a valve 200, disposed in the fluid lines 24' and 25' supplying motors 26''' and 26''''.

Valve 200 has a body 201 having pairs of ports 202, 203 communicating with fluid lines 24' and 25' respectively and 204, 205 leading to motors 26''' and 26''''. A spool 206 controls access between ports 202 and 204 and between ports 203 and 205. Spool 206 has two controlling lands 207 and 208 and a sealing land 209.

An additional port 210, is situated between ports 204 and 205 and is interconnected with the latter. When spool 206 is moved to the right, on pressurization of the left-hand side of actuator 27, ports 202 and 203 are cut off but, synchronously with this, port 204 is connected to port 210, thus interconnecting the two fluid lines to motors 26''' and 26'''' so that they do not become hydraulically locked. Port 205 is blocked at the same time as port 203.

We claim:

1. A hydrostatic transmission system in which positive displacement pumping means, adapted for connection to a prime mover, supplies fluid under pressure to positive displacement motor means adapted for connection to a load, with control means for varying the displacement in discrete steps of said pumping means and said motor means, said control means being operable first to increase the displacement of the pumping means in a number of discrete steps in succession, and then to decrease the displacement of the motor means in at least one discrete step, whereby the transmission ratio is increased, and in which the displacement of the motor means may thereafter be first increased, followed by the decrease, in a number of discrete steps, of the displacement of the pumping means, whereby the transmission ratio is lowered, the control means being further operative, when a change in the displacement of the motor means takes place, to change the displacement of the pumping means by a smaller amount in the same direction, whereby the overall change in the transmission ratio, on such change in the displacement of the motor means, is reduced as compared with the change of overall ratio which would result from changing only the displacement of the motor means.

2. A hydrostatic transmission system in which positive displacement pumping means, adapted for connection to a prime mover, supplies fluid under pressure to positive displacement motor means adapted for connection to a load, with control means for varying the displacement, in discrete steps, of at least one of them, the pumping means or the motor means, and said motor means comprising at least one motor having two groups of piston and cylinder combinations, each cooperating with cam means, and with valve means for disconnecting one group of piston and cylinder combinations from the pumping means to reduce the displacement of the motor.

3. A transmission system as claimed in claim 2, and including means for retaining liquid leaking past the pistons in the space between the pistons and the cam means and for regulating the pressure in such space to a value a little above atmospheric pressure whereby the pistons of the piston/cylinder group put out of communication with the pumping means are held out of contact with the cam means.

4. A hydrostatic transmission system in which positive displacement pumping means, adapted for connection to a prime mover, supplies fluid under pressure to positive displacement motor means adapted for connection to a load, with control means for varying the displacement, in discrete steps, of at least one of them, the pumping means or the motor means, and with a bypass valve capable of interconnecting the high-pressure and the low-pressure lines from the pumping means, said bypass valve having an obturator normally engaging a seating to block the said interconnection, and piston/cylinder means coupled to the obturator having a larger effective piston area on one side acting to close the obturator upon said seating, and a smaller piston area on the other side acting to lift the obturator from said seating, a restrictor orifice permitting flow from one side of the piston to the other whereby the obturator is normally held to its seating, and including means for exhausting the space on the large area side of the piston to lift the obturator off its seating.

5. A transmission system as claimed in claim 4 wherein said exhausting means comprises a valve resiliently urged to an open, or exhausting, condition and with means for closing the valve such means comprising an auxiliary pump coupled to the said pumping means, a piston/cylinder combination connected to the output of the said pump, and coupled mechanically to the said valve, the whole being so adjusted that the valve is closed when the said pump reaches a predetermined speed.

6. A hydrostatic transmission system in which positive displacement pumping means adapted for connection to a prime mover, supplies fluid under pressure to positive displacement motor means adapted for connection to a load, with control means for varying the displacement, in discrete steps, of at least one of them, the said pumping means or the said motor means, the control means being operable first to increase the displacement of the pumping means in a number of discrete steps in succession and then to decrease the displacement of the motor means in at least one discrete step, whereby the transmission ratio is increased, whereafter the displacement of the motor means is first increased, followed by the decrease, in a number of discrete steps, of the displacement of the pumping means whereby the transmission ratio is lowered, said motor means comprising at least four motors each directly coupled to a wheel of a vehicle, and means for reducing the displacement of the motor means comprising valve means for disconnecting from the pumping means the motors coupled to wheels at one end of the vehicle, whereby the aggregate displacement of the motors connected to the pumping means is reduced.

7. A hydrostatic transmission system in which positive displacement pumping means adapted for connection to a prime mover, supplied fluid under pressure to positive displacement motor means adapted for connection to a load, with control means for varying the displacement, in discrete steps, of at least one of them, the said pumping means or the said motor means, the control means being operable first to increase the displacement of the pumping means in a number of discrete steps in succession and then to decrease the displacement of the motor means in at least one discrete step, whereby the transmission ratio is increased, whereafter the displacement of the motor means is first increased, followed by the decrease, in a number of discrete steps, of the displacement of the pumping means, whereby the transmission ratio is lowered, the control means comprising a motor control actuator coupled to the motor means to change the displacement thereof and a hand-operated selector operable to any one of a number of predetermined settings in at least one of which settings valving passages, associated with the selector, control the flow of pressurized fluid to the motor actuator.

8. A transmission system as claimed in claim 7, and including other valving passages associated with the selector controlling the flow of pressurized fluid to an actuator coupled to the pumping means to change the displacement thereof in discrete steps each corresponding to one of the said predetermined settings of the said selector.

9. A transmission system as claimed in claim 7, and including a mechanical linkage from the said selector to a servo valve controlling the displacement of the pumping means in discrete steps each corresponding to one of the said predetermined settings of the selector, valving passages associated with the selector to control flow of pressurized fluid to an actuator adapted for changing the displacement of the motor means and a mechanical connection from the actuator to a fulcrum of the linkage for the servo valve to operate the servo valve in a direction to reduce the displacement of the pumping means on operation of the said actuator to reduce the displacement of the motor means.

10. A transmission system as claimed in claim 7 comprising a dump valve operable to interconnect the high-pressure and low-pressure fluid conduits from the pumping means and valving passages controlled by the selector operable to actuate the dump valve to interconnect the said conduits when the selector is at a setting intermediate between at least one adjacent pair of the said predetermined settings.

11. A transmission system as claimed in claim 2 in which the motor means comprises a motor of the cam operated ball-piston type having two banks of cylinders radially extending through a cylinder block from an internal pintle valve towards an encircling cam for each bank of cylinders, with means for translating the said pintle valve axially of the cylinder block to move supply ports of the valve and of one bank of cylinders out of register with one another whilst leaving the supply ports of the valve and of the other bank of cylinders undisturbed.

12. A transmission system as claimed in claim 11 having an enclosure surrounding the zone of engagement of the pistons with the cams, and a pressure relief valve maintaining the pressure in the said zone above atmospheric pressure in the presence, in the said zone, of working fluid leaking past the pistons, whereby, when a bank of cylinders is cut off from the supply of pressure fluid from the pumping means, on translation of the pintle valve as aforesaid, the pistons are held out of engagement with the cam with which they normally cooperate.